(12) United States Patent
Osawa

(10) Patent No.: US 6,871,977 B2
(45) Date of Patent: Mar. 29, 2005

(54) LIGHT SOURCE PORTION FOR BACKLIGHT MODULE, BACKLIGHT MODULE USING THE SAME, AND CONNECTION STRUCTURE OF BACKLIGHT MODULE

(75) Inventor: Hideharu Osawa, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 10/400,467

(22) Filed: Mar. 28, 2003

(65) Prior Publication Data
US 2003/0227769 A1 Dec. 11, 2003

(30) Foreign Application Priority Data
Mar. 29, 2002 (JP) ........................................ 2002-095697

(51) Int. Cl.⁷ ................................................ F21V 7/04
(52) U.S. Cl. ......................... 362/31; 362/554; 362/558; 362/561; 362/27; 362/26
(58) Field of Search ......................... 362/31, 551, 554, 362/558, 561, 27, 26, 555, 581

(56) References Cited

U.S. PATENT DOCUMENTS

| | | | |
|---|---|---|---|
| 4,024,388 A | 5/1977 | Skoff | 240/7.55 |
| 4,495,553 A | 1/1985 | Haynes | 362/311 |
| 4,686,656 A | 8/1987 | Morishima | 362/72 |
| 5,791,760 A | 8/1998 | Scherbarth et al. | 362/72 |
| 5,820,254 A | 10/1998 | Duenas | 362/473 |
| 5,964,312 A | 10/1999 | Maldonado | 180/227 |
| 6,598,987 B1 * | 7/2003 | Parikka | 362/26 |

FOREIGN PATENT DOCUMENTS

| | | |
|---|---|---|
| JP | 52-120553 | 3/1977 |
| JP | 53-113366 | 1/1978 |
| JP | 57-146363 | 3/1982 |
| JP | 05-113759 | 5/1993 |
| JP | 5-41157 | 6/1993 |
| JP | 2001-155532 | 6/2001 |
| JP | 2002-25326 | 1/2002 |

* cited by examiner

Primary Examiner—Sandra O'Shea
Assistant Examiner—Bertrand Zeade
(74) Attorney, Agent, or Firm—Rabin & Berdo, P.C.

(57) ABSTRACT

A light source portion for a backlight module that emits light to be incident on an end face of an optical waveguide. The light source portion includes a circuit board having a mounting surface, and a light emitting device having a lead terminal to be connected to the mounting surface of the circuit board and emitting light in a direction parallel to the circuit board. The light emitting device is mounted on the circuit board in such a manner that a plate thickness of the circuit board falls within a range of a thickness of the light emitting device.

8 Claims, 8 Drawing Sheets

LIGHT SOURCE PORTION FOR BACKLIGHT MODULE, BACKLIGHT MODULE USING THE SAME, AND CONNECTION STRUCTURE OF BACKLIGHT MODULE

BACKGROUND OF THE INVENTION

1. Field of the Invention

The present invention relates to a backlight module used to emit light from behind a liquid crystal display panel or the like and a light source portion used for the backlight module as well as a connection structure of the backlight module and a mounting circuit board.

2. Description of Related Art

Generally, a backlight module for improving visibility is placed behind the liquid crystal display panel. For example, a backlight module is provided to a display portion of portable equipment, such as a cellular phone, so that satisfactory visibility is ensured in circumstances where the brightness of surroundings is insufficient (at night, for example).

As shown in FIG. 8, the backlight module includes an optical waveguide 1, a light source portion 2 that emits light to be incident on the end face of the optical waveguide 1, and a mounting circuit board 3 provided behind the optical waveguide 1 and including a feed circuit to the light source portion 2.

The light source portion 2 is formed by mounting a plurality of light emitting diodes 22 on a mounting surface 21A of a light source portion circuit board 21. The light emitting diodes 22 are of a side view type that emit light in a direction parallel to the mounting surface 21A of the light source portion circuit board 21, and each generates light toward the end face of the optical waveguide 1.

The light source portion circuit board 21 is made of a flexible circuit board. The light source portion circuit board 21 is reversed as being bent at 180°, so that one end portion on which are mounted the light emitting diodes 22 opposes the end face of the optical waveguide 1 while the other end portion is guided onto the surface of the mounting circuit board 3. A wiring pattern (not shown) on the mounting surface 21A of the light source portion circuit board 21 is electrically connected to the mounting circuit board 3 through a connector or a solder joint at the other end portion. This makes it possible to feed the light emitting diodes 22 with electricity from the mounting circuit board 3 through the light source portion circuit board 21.

FIG. 9 is a side view showing a mounting structure of the light emitting diodes 22 with respect to the mounting surface 21A of the light source portion circuit board 21. Lead terminals 22A protrude respectively from the both side surfaces of each light emitting diode 22 in regard to the light emitting direction. The lead terminals 22A are formed so that they are flush with the bottom surface of the light emitting diode 22, and it is the lead terminals 22A that are connected to the wiring pattern (not shown) on the mounting surface 21A through solder joints.

According to the arrangement described above, however, a thickness t of the light source portion 2 cannot be thinner than a sum of a thickness d1 of the light emitting diode 22 and a thickness d2 of the light source portion circuit board 21, d1+d2. Hence, there is a limit to a reduction of the light source portion 2 in thickness, which makes it impossible to reduce the backlight module in thickness and hence the portable equipment in size.

In order to reduce the thickness t of the light source portion 2, there is an attempt to reduce the thickness d2 of the light source portion circuit board 21. However, for example, when the light source portion circuit board 21 is made as thin as 0.15 to 0.2 mm, the rigidity of the light source portion circuit board 21 is deteriorated considerably, and it becomes difficult to handle the light source portion circuit board 21 when the light source portion 2 is assembled. In other words, a special jig has to be used to maintain the shape of the light source portion circuit board 21, which complicates the assembly work of the light source portion 2. As a result, the productivity is reduced.

Further, according to the arrangement described above, the mounting surface 21A of the light source portion circuit board 21 is opposed to the display panel side (above the optical waveguide 1 in FIG. 8), whereas the mounting circuit board 3 is present behind the optical waveguide 1. For this reason, the light source portion circuit board 21 has to be reversed as being bent at 180°. This becomes another reason that makes it impossible to reduce the thickness of the backlight module.

When the mounting circuit board 3 of a large area is used, the light source portion circuit board 21 may be electrically connected to the mounting circuit board 3 without bending the light source portion circuit board 21. However, increasing an area of the mounting circuit board 3 is not acceptable particularly in portable equipment with which a reduction in size is a crucial problem.

In addition, according to the connection structure using a connector or a solder joint, it takes time to assemble a backlight module; moreover, the backlight module cannot be assembled automatically. Hence, there has been a need for another connection structure that can readily connect the mounting circuit board 3 to the light source portion circuit board 21.

SUMMARY OF THE INVENTION

It is therefore an object of the invention to provide a light source portion for a backlight module, having a structure advantageous in reducing a thickness.

Another object of the invention is to provide an easy-to-assemble light source portion for a backlight module.

A further object of the invention is to provide a backlight module having a structure advantageous in reducing a thickness.

Still another object of the invention is to provide a connection structure of an easy-to-assemble backlight module.

The invention relates to a light source portion for a backlight module that emits light to be incident on an end face of an optical waveguide. The light source portion includes a circuit board having a mounting surface, and a light emitting device having a lead terminal to be connected to the mounting surface of the circuit board and emitting light in a direction parallel to the circuit board. The light emitting device is mounted on the circuit board in such a manner that a plate thickness of the circuit board falls within a range of a thickness of the light emitting device.

According to this arrangement, because the light emitting device is mounted on the circuit board in such a manner that the plate thickness of the circuit board falls within the range of the thickness of the light emitting device, an overall thickness of the light source portion for the backlight module is equal to the thickness of the light emitting device. Hence, a marked reduction in thickness can be achieved compared with a conventional light source portion for a backlight module having a thickness equal to a total of the thickness of the light emitting device and the plate thickness of the circuit board. This in turn makes it possible to achieve a reduction of the backlight module in thickness.

Moreover, because the circuit board can have a plate thickness as thick as the light emitting device, a substrate having a thick plate thickness can be used as the circuit board. Hence, the circuit board can attain satisfactory rigidity, and is thereby handled easily, which makes the assembly work of the light source portion easier. As a result, the productivity of the light source portion for the backlight module can be improved, which in turn makes it possible to improve the productivity of the backlight module.

It is preferable that the circuit board is provided with a notch for accommodating the light emitting device at an end portion. In this case, it is preferable that the light emitting device is placed inside the notch of the circuit board.

According to this arrangement, by placing the light emitting device inside the notch of the circuit board, it is possible to achieve a state where the plate thickness of the circuit board falls within a range of the thickness of the light emitting device. Also, by placing the light emitting device inside the notch, the size of the light source portion can be reduced when viewed in a plane from above in a direction perpendicular to the circuit board, which makes it possible to reduce an overall size of the backlight module.

It is preferable that the lead terminal of the light emitting device protrudes in the direction parallel to the circuit board at an intermediate portion in a thickness direction of the light emitting device.

According to this arrangement, because the lead terminal protrudes from the light emitting device at the intermediate portion in the thickness direction of the light emitting device, by jointing the lead terminal to the circuit board, it is possible to mount the light emitting device on the circuit board in a state where the plate thickness of the circuit board falls within a range of the thickness of the light emitting device.

For example, the lead terminal protruding from the light emitting device in a direction parallel to the circuit board is merely jointed to the wiring pattern on the circuit board at the edge portion of the notch.

It is preferable that the light emitting device has a surface that is flush or nearly flush with a surface of the circuit board.

The surface that is flush or nearly flush with the surface of the circuit board may be a surface on the opposite side of the mounting surface.

According to this arrangement, for example, when the light emitting device protrudes from the mounting surface of the circuit board, it is possible to secure a space needed for an electrical connection between the circuit board and the mounting circuit board of electronic equipment or the like on the mounting surface side of the circuit board.

It is preferable that the circuit board includes an external connection terminal portion on the mounting surface.

According to this arrangement, the external connection terminal portion is provided to the mounting surface of the circuit board, and a feeding terminal provided to the mounting circuit board of electronic equipment or the like can be connected to the external connection terminal portion.

For example, when the surface of the circuit board on the opposite side of the mounting surface is made substantially flush with one surface of the light emitting device, the mounting surface of the circuit board is allowed to oppose the mounting circuit board of electronic equipment or the like. This makes it possible to readily achieve an electrical connection between the circuit board of the light source portion and the mounting circuit board of electronic equipment or the like without the need to bend the circuit board or increase an area of the mounting circuit board of electronic equipment or the like.

A backlight module of the invention includes an optical waveguide, and the light source portion arranged as above that emits light to be incident on an end face of the optical waveguide.

According to this arrangement, because the light source portion can be reduced in thickness, it is possible to achieve a reduction of the backlight module in thickness.

A connection structure of a backlight module of the invention is a connection structure for connecting a backlight module including an optical waveguide and a light source portion that emits light to be incident on an end face of the optical waveguide to a mounting circuit board to be electrically connected to the light source portion. The light source portion includes a circuit board having an external connection terminal portion on a mounting surface placed to oppose the mounting circuit board, and a light emitting device that is mounted on the mounting surface of the circuit board and emits light in a direction parallel to the circuit board. Also, the mounting circuit board includes a feeding terminal that establishes an electrical connection with the external connection terminal portion through press-adhesion at a position opposing the external connection terminal portion on the mounting surface of the circuit board of the light source portion.

For example, the external connection terminal portion may be made of a wiring pattern formed on the mounting surface of the circuit board, and the feeding terminal may be a terminal fitting or terminal member that can be press-adhered to the external connection terminal portion. Conversely, the external connection terminal portion may be an elastic terminal member, and the feeding terminal maybe a wiring pattern to which the external connection terminal portion is press-adhered.

According to the invention, the mounting surface of the circuit board of the light source portion opposes the mounting circuit board of electronic equipment or the like, and by pressing-adhering the external connection terminal portion on the circuit board of the light source portion to the feeding terminal on the mounting circuit board, an electrical connection can be established between the light source portion and the mounting circuit board.

It is thus possible to achieve an electrical connection between the light source portion and the mounting circuit board with a simple arrangement by eliminating a complex work, such as connection through a connector or a solder joint. This in turn makes the assembly of equipment using a backlight module easier and enables auto-assembly.

The light source portion may have any one of or an arbitrary combination of two or more of the foregoing characteristics.

The above and other objects, features, and advantages of the invention will become more apparent from the following description of embodiments with reference to the accompanying drawings.

DESCRIPTION OF THE PREFERRED EMBODIMENTS

Figure 1:
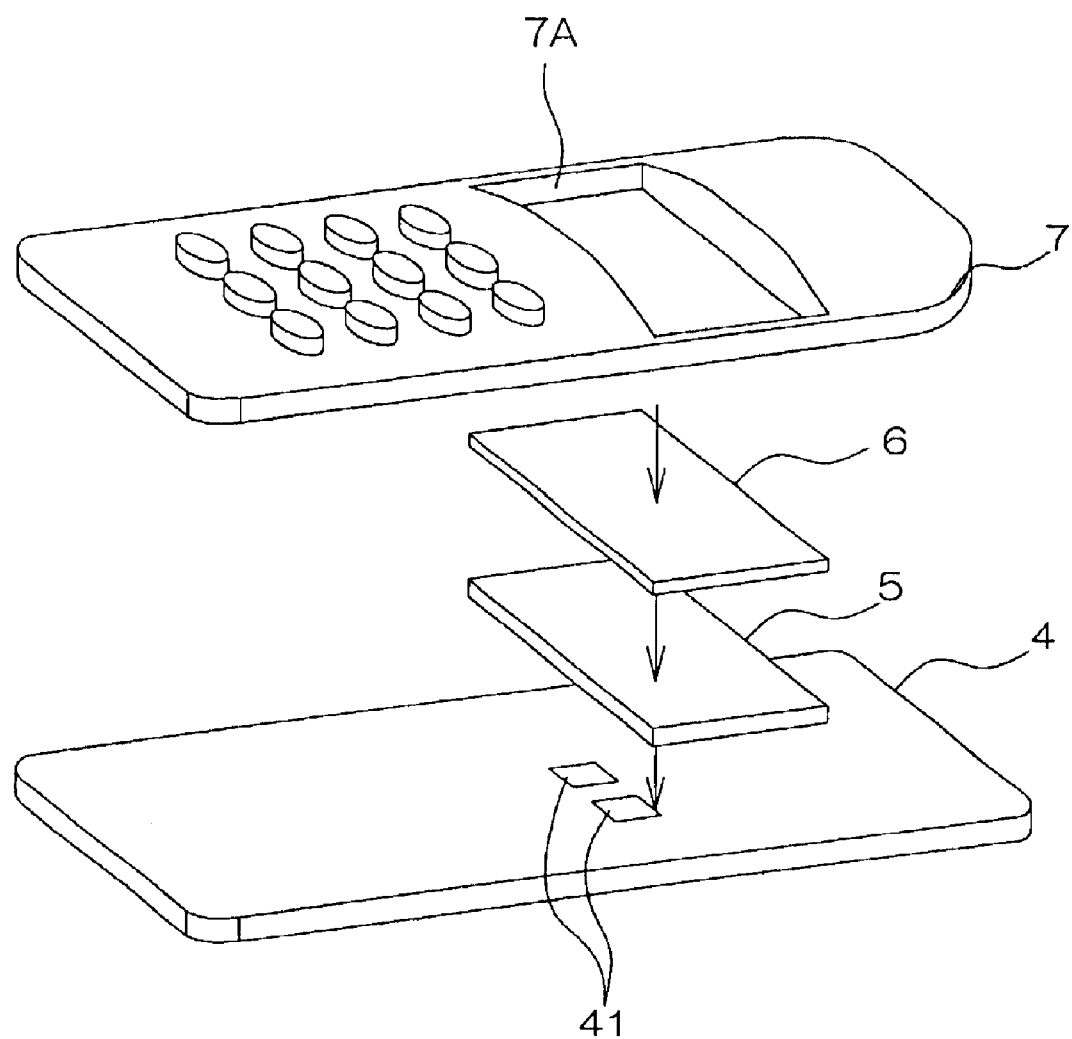
FIG. 1 is an exploded perspective view showing an arrangement of a cellular phone as an example of portable electronic equipment to which a backlight module according to one embodiment of the invention is applied.

FIG. 1 is an exploded perspective view showing an arrangement of a cellular phone as an example of portable electronic equipment to which a backlight module according to one embodiment of the invention is applied. The cellular phone includes a mounting circuit board 4, a backlight module 5 that emits light upon feeding of electricity from the mounting circuit board 4, a liquid crystal display panel 6 superposed on the backlight module 5, and a front cover 7. The front cover 7 is provided with a display window 7A, and the liquid crystal display panel 6 is placed in accordance with the display window 7A.

The mounting circuit board 4 is provided with electronic components forming circuits that perform control related to telephone calls and transmission of incoming and outgoing electronic mails, display control of the liquid crystal display panel 6, and control of the feeding of electricity to the backlight module 5. The mounting circuit board 4 is provided with a pair of feeding terminals 41 for feeding the backlight module 5 with electricity at a position opposing the vicinity of one end portion of the backlight module 5.

Figure 2:
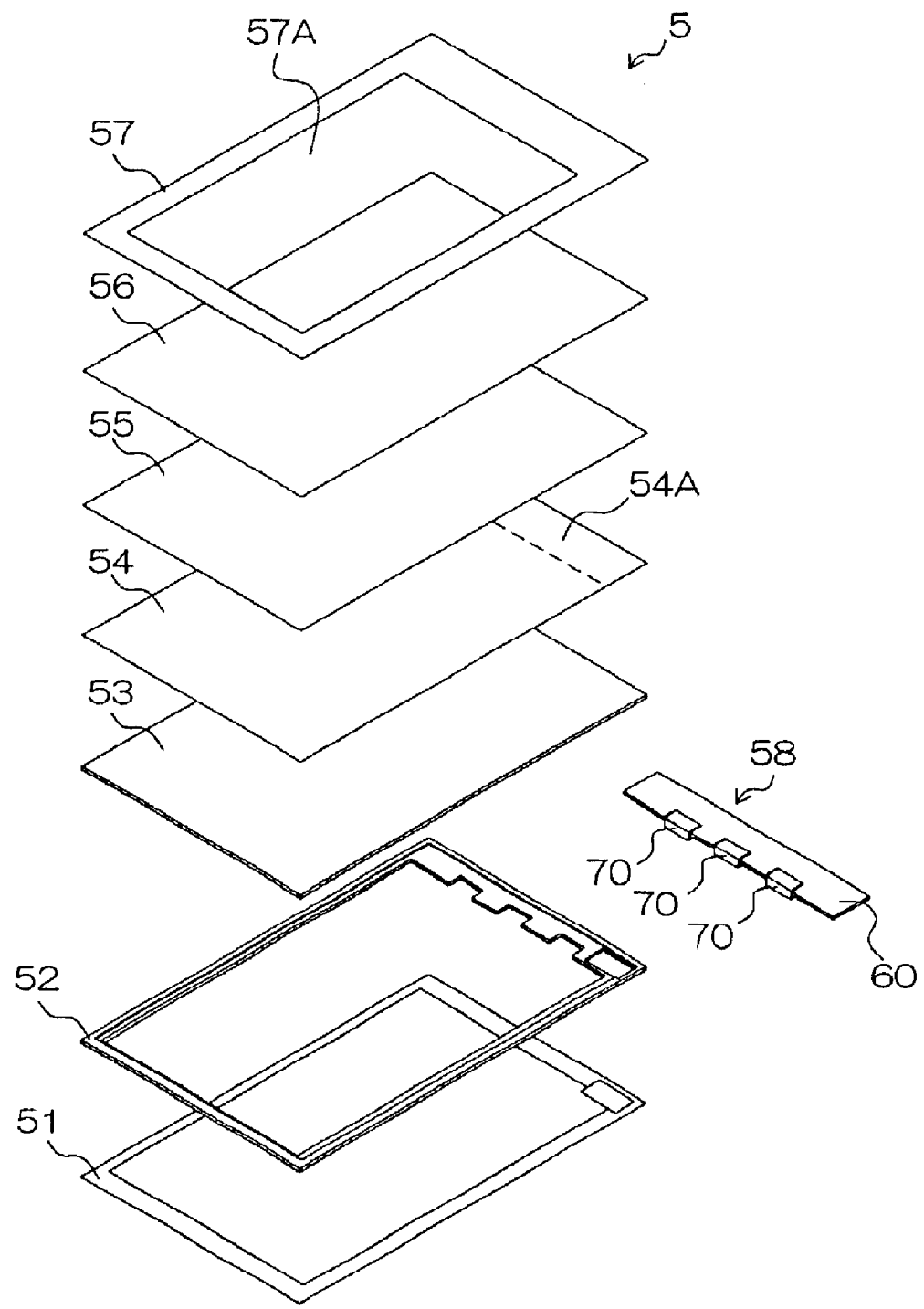
FIG. 2 is an exploded perspective view used to explain an arrangement of the backlight module.

FIG. 2 is a schematic exploded perspective view used to explain an arrangement of the backlight module 5. The backlight module 5 is formed by sequentially depositing a reflection film 51, a reflection frame 52, an optical waveguide 53, a diffusion film 54, a first prism film 55, a second prism film 56, and a light-shielding frame 57 in this order from the mounting circuit board 4 (see FIG. 1) side. A light source portion 58 is placed at one end portion of the optical waveguide 53.

When the backlight module 5 is assembled, the light source portion 58 is attached to the reflection frame 52 first. Then, the reflection film 51 is attached to the reflection frame 52. Further, the optical waveguide 53, the diffusion film 54, the first prism film 55, and the second prism film 56 are placed inside the reflection frame 52, and the light-shielding frame 57 seals the entire lamination. The respective components are integrated into one body in this manner, and the backlight module 5 is thus completed.

The light source portion 58 emits light for a backlight to be incident on the one end portion of the optical waveguide 53. The light incident on the optical waveguide 53 from the light source portion 58 is diffused across the optical waveguide 53 entirely. Then, the light is reflected in a direction toward the liquid crystal display panel 6 due to the function of the reflection film 51, and part of the light trying to go out from the optical waveguide 53 is forced to come inside the optical waveguide 53 again due to the function of the reflection frame 52. The light heading in a direction toward the liquid crystal display panel 6 from the optical waveguide 53 is turned into diffused light by the diffusion film 54, after which it is adjusted to be light with directivity in a direction that intersects at right angles with the liquid crystal display panel 6 by the first prism film 55 and the second prism film 56, and is guided to the liquid crystal display panel 6 by passing through a light-transmitting window 57A of the light-shielding frame 57.

The first and second prism films 55 and 56 are arranged to collect incident light respectively in the directions that intersect at right angles with each other (in the directions along the films 51 and 52, respectively), and light having directivity in a direction that intersects at right angles with the liquid crystal display panel 6 is thereby generated. Visibility of a display on the liquid crystal display panel 6 can be thus improved.

A light-shielding portion 54A is provided to one end portion of the diffusion film 54, which prevents direct light from the light source portion 58 from heading toward the first prism film 55.

Figure 3:
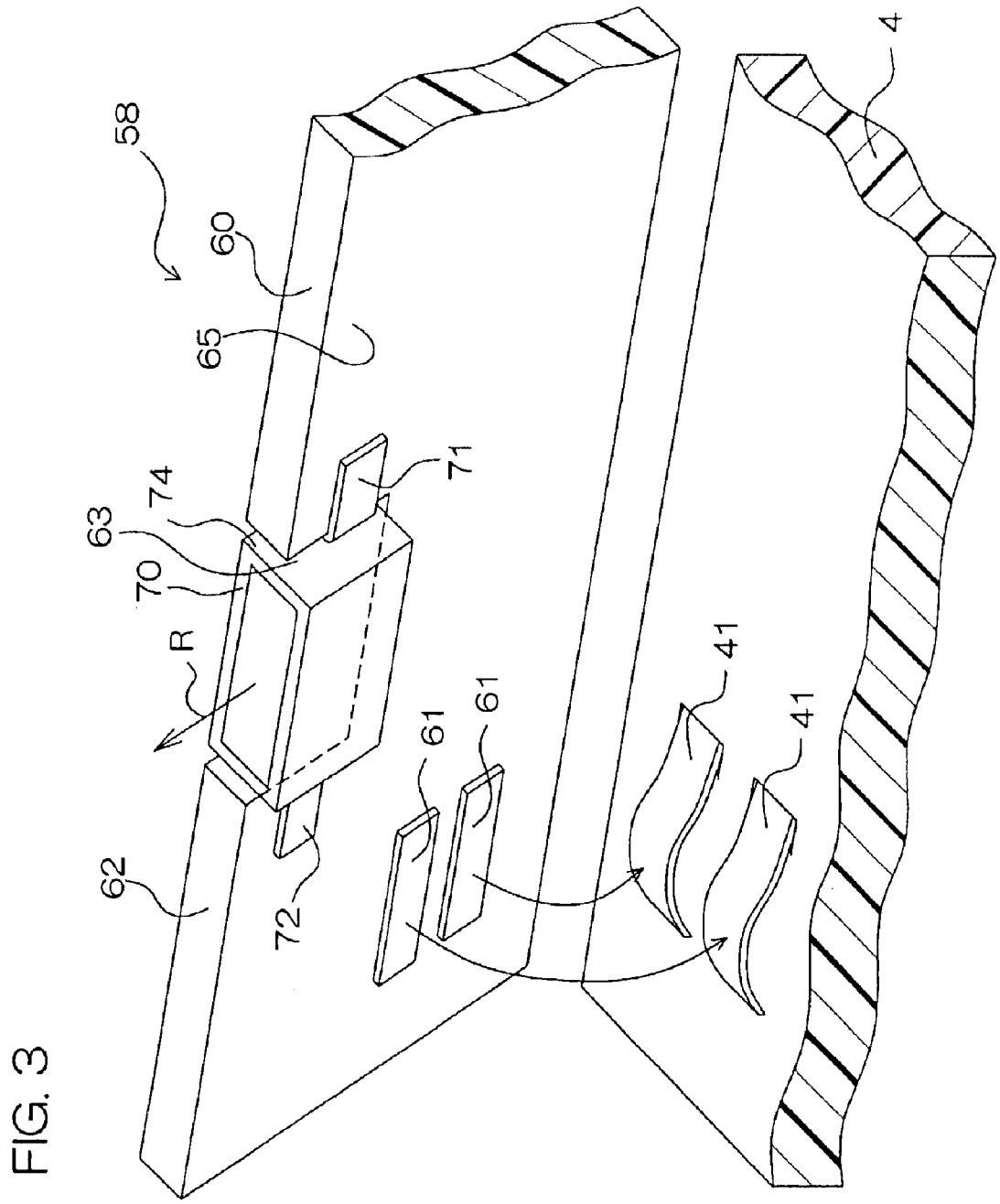
FIG. 3 is a perspective view used to explain an arrangement of a light source portion and a connection structure between the light source portion and a mounting circuit board.

FIG. 3 is a perspective view used to explain an arrangement of the light source portion 58 and a connection structure of the light source portion 58 and the mounting circuit board 4. The light source portion 58 includes an elongate rectangular circuit board 60 placed along the end face of the optical waveguide 53 and lead terminals 71 and 72 that are connected to the wiring pattern (not shown) on a mounting surface 65 of the circuit board 60, and is provided with a plurality of (three, in this embodiment, see FIG. 2) light emitting diodes 70 that emit light in a light emitting direction R parallel to the circuit board 60. In other words, the light emitting diodes 70 are of a side view type, and are arranged in such a manner that each emits light to be incident on one end face of the optical waveguide 53 by generating light (for example, white light) in the light emitting direction R parallel to the mounting surface 65 of the circuit board 60.

The circuit board 60 is provided with almost rectangular notches 63 for accommodating the light emitting diodes 70 at one end face 62 side opposing the optical waveguide 53. Each of the light emitting diode 70 is placed inside one of the notches 63. The lead terminals 71 and 72 of the light emitting diode 70 are connected to the wiring pattern (not shown) formed on the edge portion of the notch 63 in the mounting surface 65 through solder joints.

The mounting surface 65 of the circuit board 60 is provided with a pair of external connection terminal portions 61 at a position opposing the feeding terminals 41 of the mounting circuit board 4. The external connection terminal portions 61 are made of a wiring pattern formed on the mounting surface 65. On the other hand, the feeding terminals 41 provided to the mounting circuit board 4 are made of terminal members having of an upward convex shape and the spring property. Hence, by superposing the circuit board 60 on the mounting circuit board 4 and press-adhering the external connection terminal portions 61 to the feeding terminals 41, an electrical connection is established between the feeding terminals 41 and the external connection terminal portions 61, and electricity can be thus fed to the light emitting diodes 70 of the light source portion 58 from the mounting circuit board 4.

The press-adhered state can be maintained by engaging the front cover 7 shown in FIG. 1 with the mounting circuit board 4 or a rear cover (not shown).

Figure 4:
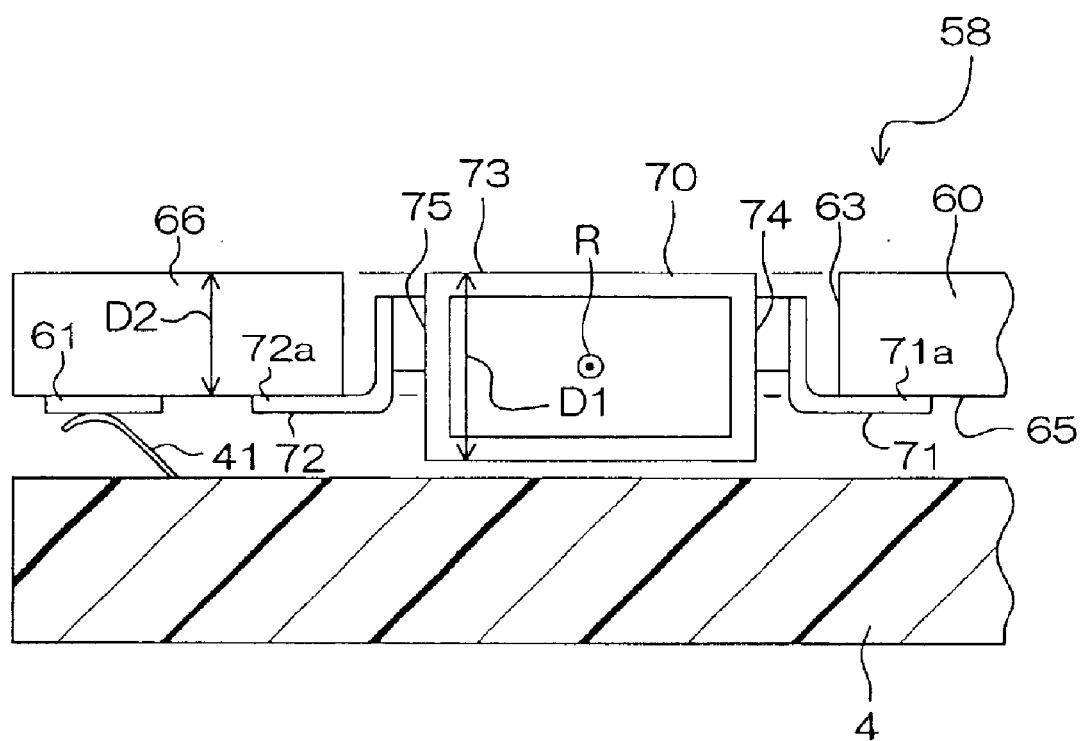
FIG. 4 is a side view of the light source portion when viewed from an optical waveguide side.

FIG. 4 is a side view of the light source portion 58 when viewed from the optical waveguide 53 side. The light emitting diode 70 is placed inside the notch 63, and the lead terminals 71 and 72 protrude outward respectively from the both side surfaces 74 and 75 in regard to the light emitting direction R along a direction parallel to the mounting surface 65 of the circuit board 60 at the intermediate portion in the thickness direction of the light emitting diode 70. The light emitting diode 70 protrudes slightly from the mounting surface 65 of the circuit board 60, and thereby secures a space between the mounting surface 65 and the mounting circuit board 4 that is needed for a connection between the external connection terminal portions 61 and the feeding terminals 41. On the other hand, a surface 73 of the light emitting diode 70 that does not oppose the mounting circuit board 4 is substantially flush with a surface 66 of the circuit board 60 on the opposite side of the mounting surface 65.

According to this embodiment, the light emitting diode 70 is mounted on the circuit board 60 in such a manner that a plate thickness D2 of the circuit board 60 falls within a range of a thickness D1 of the light emitting diode 70. This makes an overall thickness of the light source portion 58 equal to the thickness D1 of the light emitting diode 70. Hence, it is possible to achieve an extremely thin light source portion compared with the related art wherein the thickness of the light source portion is equal to a total of the thickness of the light emitting diode and the thickness of the circuit board.

Also, because the plate thickness D2 of the circuit board 60 can be set within the range of the thickness D1 of the light emitting diode 70, a substrate having the sufficient plate thickness D2 can be used as the circuit board 60. For example, a glass epoxy substrate with a plate thickness as thick as approximately 0.3 mm can be used as the circuit board 60. Because the circuit board 60 having such a large plate thickness can attain satisfactory rigidity, it is no longer necessary to use a special jig to maintain the shape of the circuit board 60 when the light source portion 58 is assembled. This makes assembly of the light source portion 58 markedly easy compared with the related art.

Also, because it is arranged in such a manner that the electrical connection is established between the circuit board 60 and the mounting circuit board 4 by providing the external connection terminal portions 61 to the mounting surface 65 of the circuit board 60 and then press-adhering the feeding terminals 41 on the mounting circuit board 4 to the external connection terminal portions 61, the backlight module 5 and the mounting circuit board 4 can be connected with marked ease compared with the related art wherein a connection is established through the use of a connector or solder. This makes the assembly work of a cellular phone easier, and thereby improves the productivity. Also, this enables auto-assembly of a cellular phone.

Moreover, because the mounting surface 65 of the circuit board 60 opposes the mounting circuit board 4, it is no longer necessary to reverse the circuit board of the light source portion through bending at 180° as with the case in the related art. It is thus possible to achieve a reduction of the backlight module 5 in thickness more effectively.

Figure 5:
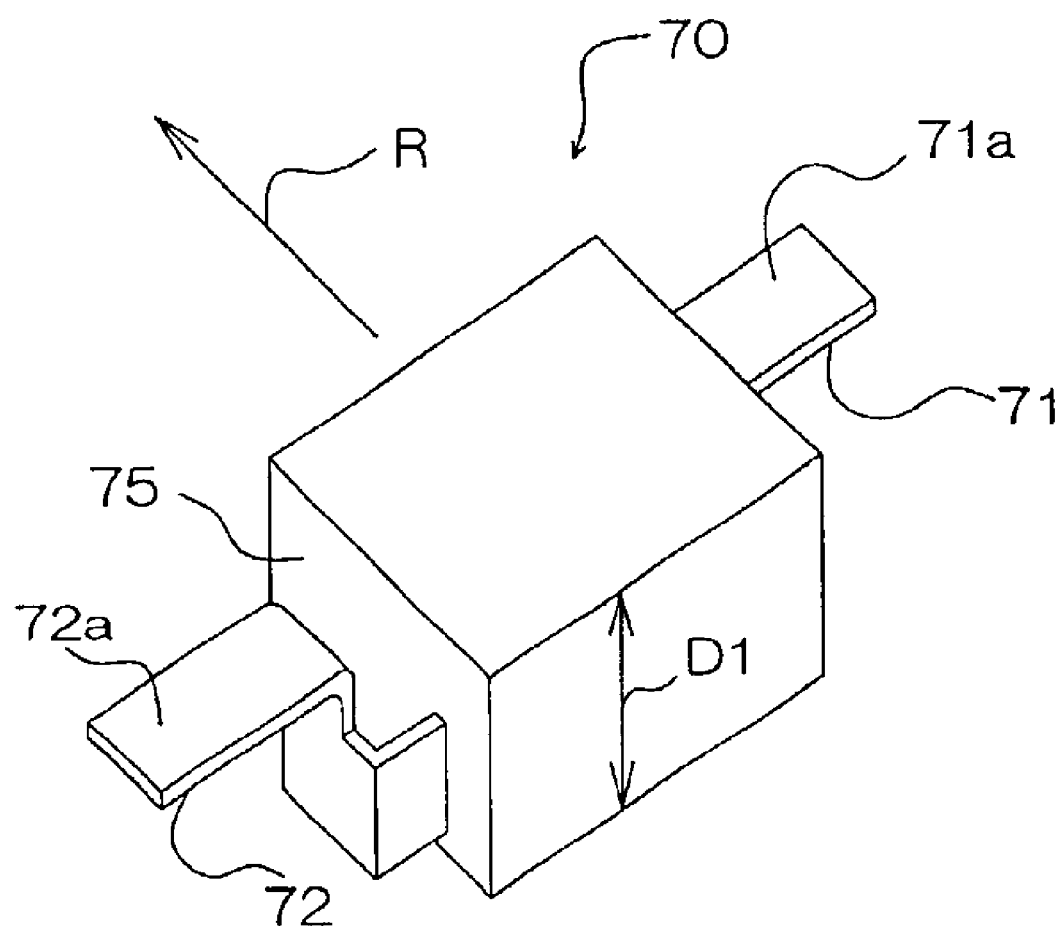
FIG. 5 is a perspective view used to explain an arrangement of a light emitting diode.

FIG. 5 is a perspective view used to explain an arrangement of the light emitting diode 70. The light emitting diode 70 includes a pair of lead terminals 71 and 72 protruding respectively from the both side surfaces 74 and 75 (see FIG. 4) in regard to the light emitting direction R. The lead terminals 71 and 72 are pulled out to the outside respectively from the vicinity of the rear ends (in the vicinity of the rear ends in regard to the light emitting direction R) of the both side surfaces 74 and 75 of the light emitting diode 70 to extend forward (light emitting direction R) as being bent along the side surfaces 74 and 75. Then, they further extend along the thickness direction of the light emitting diode 70 to be bent outward to extend away from the side surfaces 74 and 75 at the intermediate portion in the thickness direction. Joint portions 71a and 72a are thereby formed along the mounting surface 65 of the circuit board 60. It is the joint portions 71a and 72a that are connected to the wiring pattern on the mounting surface 65 through solder joints.

Figure 6:
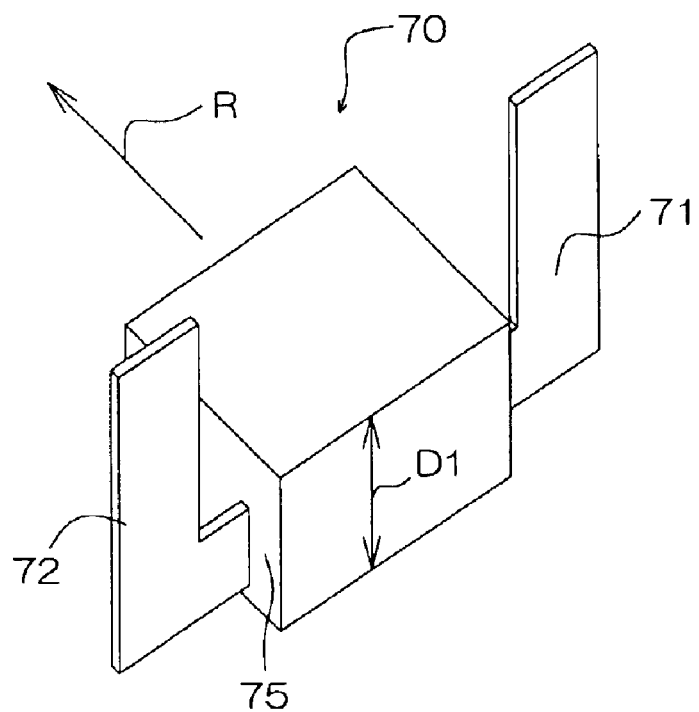
FIG. 6(a) and FIG. 6(b) are perspective views used to explain a process of molding lead terminals of the light emitting diode.
Figure 6:
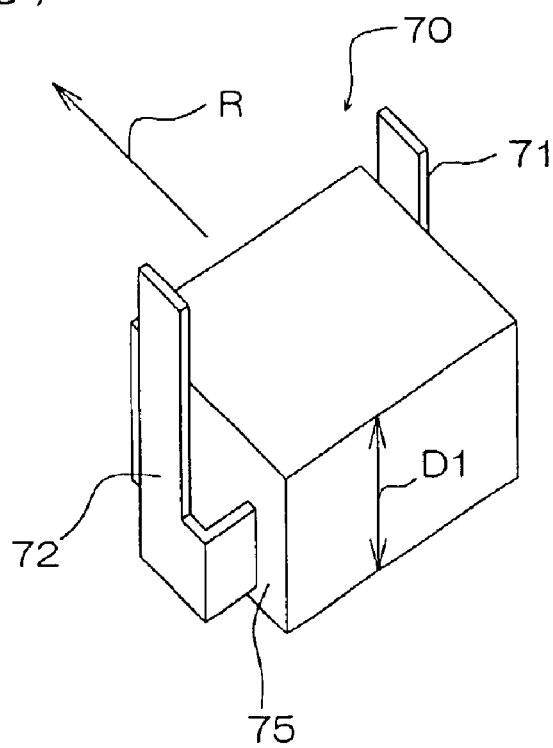

As shown in FIG. 6(a), the lead terminals 71 and 72 of the light emitting diode 70 are L-shaped plates protruding respectively from the both side surfaces 74 and 75 before they are molded. As shown in FIG. 6(b), the lead terminals 71 and 72 in this state are bent forward (light emitting direction R) near at the roots along the side surfaces 74 and 75 of the light emitting diode 70. The lead terminals 71 and 72 molded into the state shown in FIG. 5 are obtained by further bending the lead terminals 71 and 72 outward at the intermediate position in the range of the thickness D1 of the light emitting diode 70.

Figure 7:
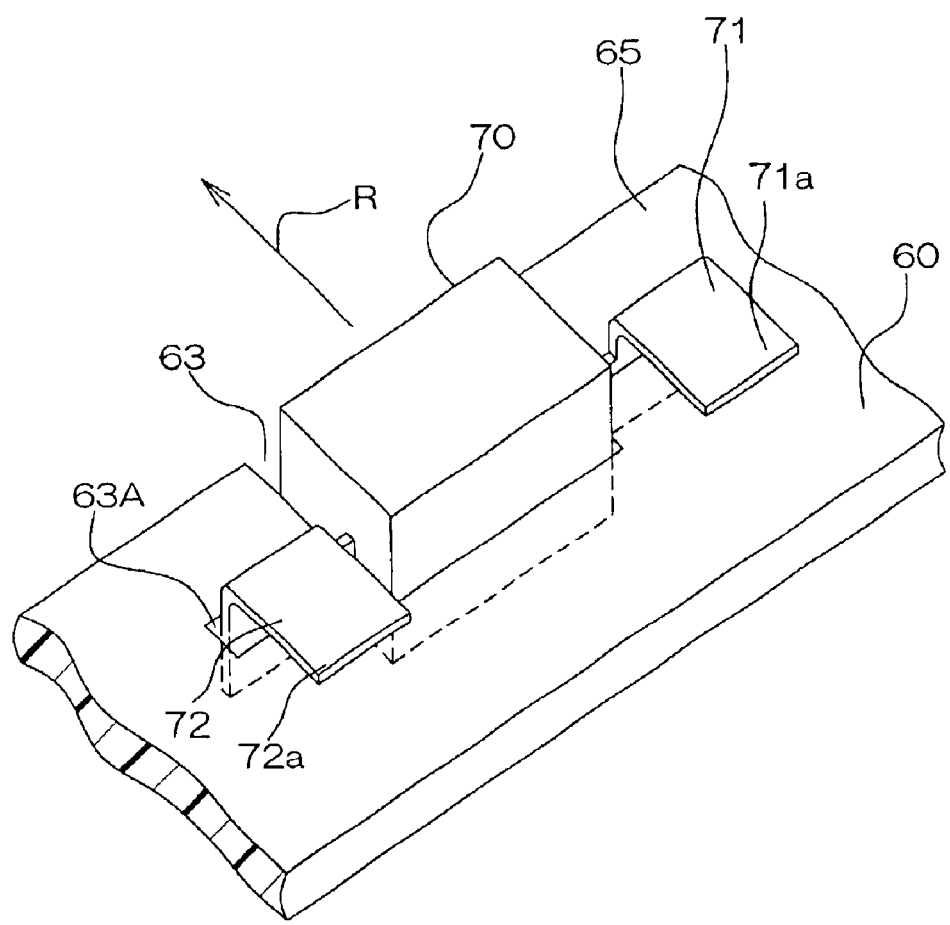
FIG. 7 is a perspective view showing another molded state of the lead terminals of the light emitting diode.
Figure 8:
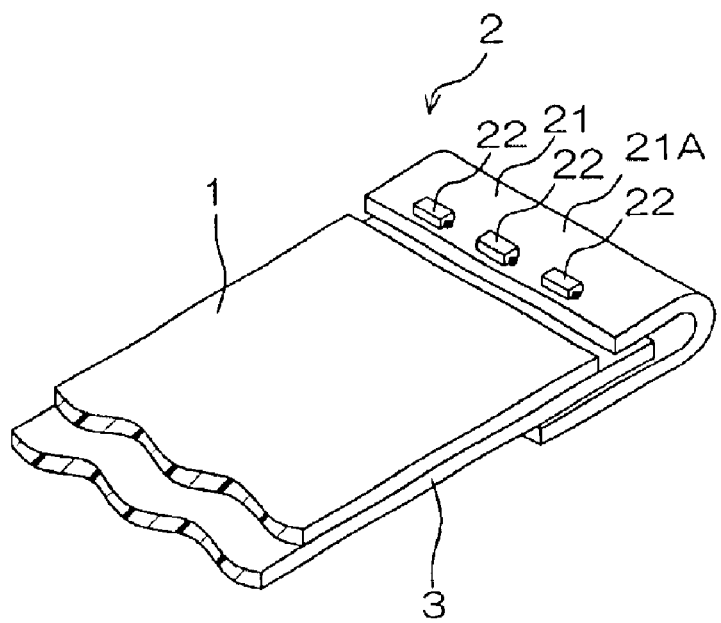
FIG. 8 is a perspective view used to explain an arrangement of a backlight module in the related art.
Figure 9:
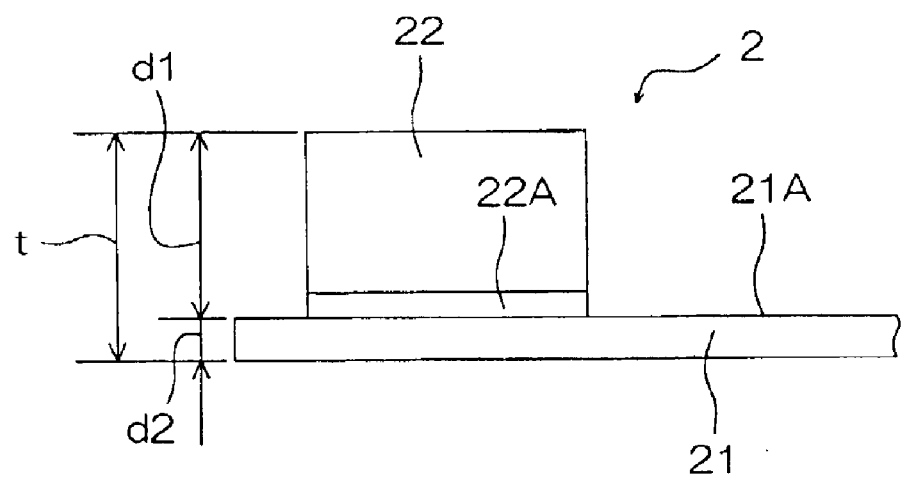
FIG. 9 is a side view used to explain an arrangement of a light source portion of the backlight module in the related art.

Instead of bending the lead terminals 71 and 72 twice, as shown in FIG. 7, the lead terminals 71 and 72 in the state shown in FIG. 6(a) may be bent in a direction along the mounting surface 65 at the intermediate position in the range of the thickness direction D1 of the light emitting diode 70. In this case, the circuit board 60 is provided with notch portions 63A on the inner side from the open end of the notch 63, so that the lead terminals 71 and 72 can be connected to the mounting surface 65 of the circuit board 60 satisfactorily through solder joints at the edge portion of the notch 63 by allowing the root portions of the lead terminals 71 and 72 to go through the notch portions 63A.

In the case of FIG. 7, the lead terminals 71 and 72 are bent on the opposite side of the light emitting direction R. However, the lead terminals 71 and 72 may be bent in the light emitting direction R.

The above description described one embodiment of the invention. It should be appreciated, however, that the invention can be implemented in any other embodiment. For example, the above embodiment is arranged in such a manner that the notches 63 are provided to the circuit board 60 and the light emitting diodes 70 are accommodated in the respective notches 63. However, the notches 63 are not necessarily provided as long as the light emitting diodes 70 can be connected to the circuit board 60. It should be noted, however, that by adopting the arrangement described above for accommodating the light emitting diodes 70 into the notches 63, the size of the light source portion 58 can be smaller when viewed in a plane.

Also, the embodiment above is arranged in such a manner that the one surface 73 of the light emitting diode 70 is flush with the surface 66 of the circuit board 60 on the opposite side of the mounting surface 65. However, the surfaces 73 and 66 do not have to be flush.

Further, in the embodiment above, the feeding terminals 41 made of terminal members that elastically abut against the external connection terminal portions 61 are provided to the mounting circuit board 4 side. However, feeding terminals made of a metal pattern may be provided to the mounting circuit board 4 side while external connection terminal portions made of terminal members that can be elastically press-adhered to the feeding terminal portions may be provided to the circuit board 60 side.

The foregoing description has described embodiments of the invention in detail. It should be appreciated, however, that these embodiments represent examples to provide clear understanding of the technical contents of the invention, and the invention is not limited to these examples. The sprit and the scope of the invention, therefore, are limited solely by the scope of the appended claims.

This application is based on Japanese Patent Application No. 2002-95697 filed with the Japanese Patent Office on Mar. 29, 2002, the entire content of which is incorporated hereinto by reference.

What is claimed is:

1. A connection structure of a backlight module for connecting a backlight module to a mounting circuit board, the backlight module including an optical waveguide and a light source portion that emits light to be incident on an end face of the optical waveguide, the mounting circuit board being electrically connectable to the light source portion, wherein:

the light source portion includes a circuit board having an external connection terminal portion on a mounting surface placed to oppose the mounting circuit board, and a light emitting device that is mounted on the mounting surface of the circuit board and emits light in a direction parallel to the circuit board; and the mounting circuit board includes a feeding terminal, provided at a position opposing the external connection terminal portion on the mounting surface of the circuit board of the light source portion, for establishing an electrical connection with the external connection terminal portion through press-adhesion.

2. A light source portion of a backlight module, comprising:

a circuit board having a surface; and a light emitting device mounted to the circuit board, and emitting light that is to be incident on an end face of an optical waveguide, and in a direction parallel to the surface of the circuit board, wherein the light emitting device has a thickness, as measured in a direction perpendicular to the surface of the circuit board, that is greater than a thickness of the circuit board, and wherein when said light emitting device is mounted to the circuit board, a region of the light source portion that includes the entire light emitting device and at least a portion of the circuit board, has a thickness in the direction perpendicular to the surface of the circuit board that is equal to the thickness of the light emitting device.

3. A backlight module, comprising:

an optical waveguide; and a light source portion, including:

a circuit board having a surface; and a light emitting device mounted to the circuit board, and emitting light that is to be incident on an end face of the optical waveguide, and in a direction parallel to the surface of the circuit board, wherein the light emitting device has a thickness, as measured in a direction perpendicular to the surface of the circuit board, that is greater than a thickness of the circuit board, and wherein when said light emitting device is mounted to the circuit board, a region of the light source portion that includes the entire light emitting device and at least a portion of the circuit board, has a thickness in the direction perpendicular to the surface of the circuit board that is equal to the thickness of the light emitting device.

4. The light source portion for a backlight module according to claim 2, wherein:

the circuit board is provided with a notch for accommodating the light emitting device at one end portion; and the light emitting device is placed inside the notch of the circuit board.

5. The light source portion for a backlight module according to claim 2, wherein the light emitting device has a lead terminal that protrudes in the direction parallel to the circuit board at an intermediate portion in a thickness direction of the light emitting device.

6. The light source portion for a backlight module according to claim 2, wherein the light emitting device has a surface that is flush or nearly flush with a surface of the circuit board.

7. The light source portion for a backlight module according to claim 2, wherein the circuit board has a mounting surface, and an external connection terminal portion on the mounting surface.

8. The light source portion for a backlight module according to claim 2, wherein said light emitting device and said circuit board are arranged so that an overall thickness of said light source portion is equal to the thickness of the light emitting device.

* * * * *